United States Patent [19]

Suesser et al.

[11] 4,025,713
[45] May 24, 1977

[54] ELECTRIC GLASS-MELTING FURNACES

[75] Inventors: Vaclav Suesser; Josef Vach; Ivan Ladr; Jiri Auerbeck, all of Hradec Kralove, Czechoslovakia

[73] Assignee: Statni vyzkumny ustav sklarsky, Hradec Kralove, Czechoslovakia

[22] Filed: Dec. 16, 1975

[21] Appl. No.: 641,176

[30] Foreign Application Priority Data

Dec. 20, 1974 Czechoslovakia ............... 8850/74

[52] U.S. Cl. ................................................ 13/6
[51] Int. Cl.² ........................................ C03B 5/02
[58] Field of Search ............................ 13/6, 23

[56] References Cited

UNITED STATES PATENTS

| 3,378,618 | 4/1968 | Vach et al. | 13/6 |
| 3,395,237 | 7/1968 | Orton | 13/6 |

Primary Examiner—R. N. Envall, Jr.

[57] ABSTRACT

An electric glass furnace construction for improving the homogeneity of the glass melt while maintaining adequate cooling of the melting zone floor is described. A plurality of vertical heating electrodes are disposed in transversely spaced, longitudinally extending rows in the melting zone of the furnace. The successive rows are fed by successively displaced phases of a multiphase, multitap voltage source, with the transversely corresponding electrodes in each row being provided with the same potential. The electrodes in each row which are longitudinally closest to an apertured partition wall that separates the melting zone from the working zone of the furnace are provided with a voltage which is larger than the remaining electrodes of the corresponding rows. The transverse cross-section of the restricted passage in the partition is provided with an effective transverse dimension that is between 20 and 30% of the corresponding effective transverse dimension of the melting zone of the furnace.

4 Claims, 2 Drawing Figures

ELECTRIC GLASS-MELTING FURNACES

BACKGROUND OF THE INVENTION

The invention relates to electric glass-melting furnaces, and more particularly to furnaces of such type in which the heating of the glass melt is effected by means of a plurality of heating electrodes vertically extending from a bottom floor in the melting zone of the furnace.

Prior designs of this general type have exhibited both poor homogeneity of the glass melt which is heated by the furnace, and localized hot spots at the interfaces of the electrodes and the bottom wall of the furnace melting zone. Previous attempts to solve the latter problem have only compounded the former, such solutions generally being in the form of the provision of a system of refractory blocks which are mounted on the bottom surface of the melting zone for supporting the individual electrodes.

In general, the use of such refractory blocks requires the provision of separate and expensive cooling facilities in association therewith, and/or the necessity of providing channels in the bottom surface of the melting zone. The individual channels communicate with a restricted passage provided at the bottom of a cooled partition wall which longitudinally separates the electrode-containing melting zone from the working zone of the furnace.

Beside the expense and complication of such arrangement, the resulting unevenness of the bottom surface of the working zone severely impedes the flow of melt through the melting zone and through the restricted passage of the partition to the working zone.

SUMMARY OF THE INVENTION

The improved glass-melting furnace construction of the present invention avoids these disadvantages by yielding a homogeneous glass melt and an efficient cooling of the bottom surface of the furnace melting zone without the necessity of refractory blocks and its associated cooling facilities and channels.

In an illustrative embodiment, the melting zone of the furnace is provided with at least three transversely spaced, longitudinally extending rows of the vertical heating electrodes, each of the electrodes being directly affixed to the bottom of the melting zone. The electrodes are further arranged in a plurality of electrode units, each unit illustratively consisting of a pair of longitudinally spaced, conductively connected ones of the electrodes.

A three-phase voltage source is illustratively provided with a plurality of transformers having a multitapped secondary winding for providing voltages of prescribed phase and amplitude to the above-arranged electrodes in the melting furnace. In particular, transversely corresponding ones of the electrodes in the successive rows are excited by voltages of progressive phase shift and essentially equal amplitude, which has been found to lead to the uniform heating of the glass melt between the successive rows in the transverse direction. Additionally, the electrode units of each row which are longitudinally closest to the restricted passage in the separating partition are excited with a voltage which is higher than the voltage applied to the remaining electrode units such rows. Such technique of excitation, wherein the electrode units of each row are excited by the same phase but by longitudinally decreasing voltage, has been found to produce a reverse component of glass flow from the working zone through the restricted passage and along the bottom of the melting zone, such reverse flow serving to effectively cool the bottom surface even at the interfaces between such surface and the electrodes. The reverse flow effect has been found to be particularly enhanced if the effective dimension of the transverse cross-section of the restricted passage falls within the range of 20 – 30% of the corresponding effective dimension of the transverse cross-section of the melting zone. Such effective dimension, in turn, is directly proportional to the area of the appropriate cross-section and inversely proportional to the circumference of the associated cross-section.

BRIEF DESCRIPTION OF THE DRAWING

The invention is further set forth in the following detailed description taken in conjunction with the appended drawing, in which.

DETAILED DESCRIPTION

Figure 1:
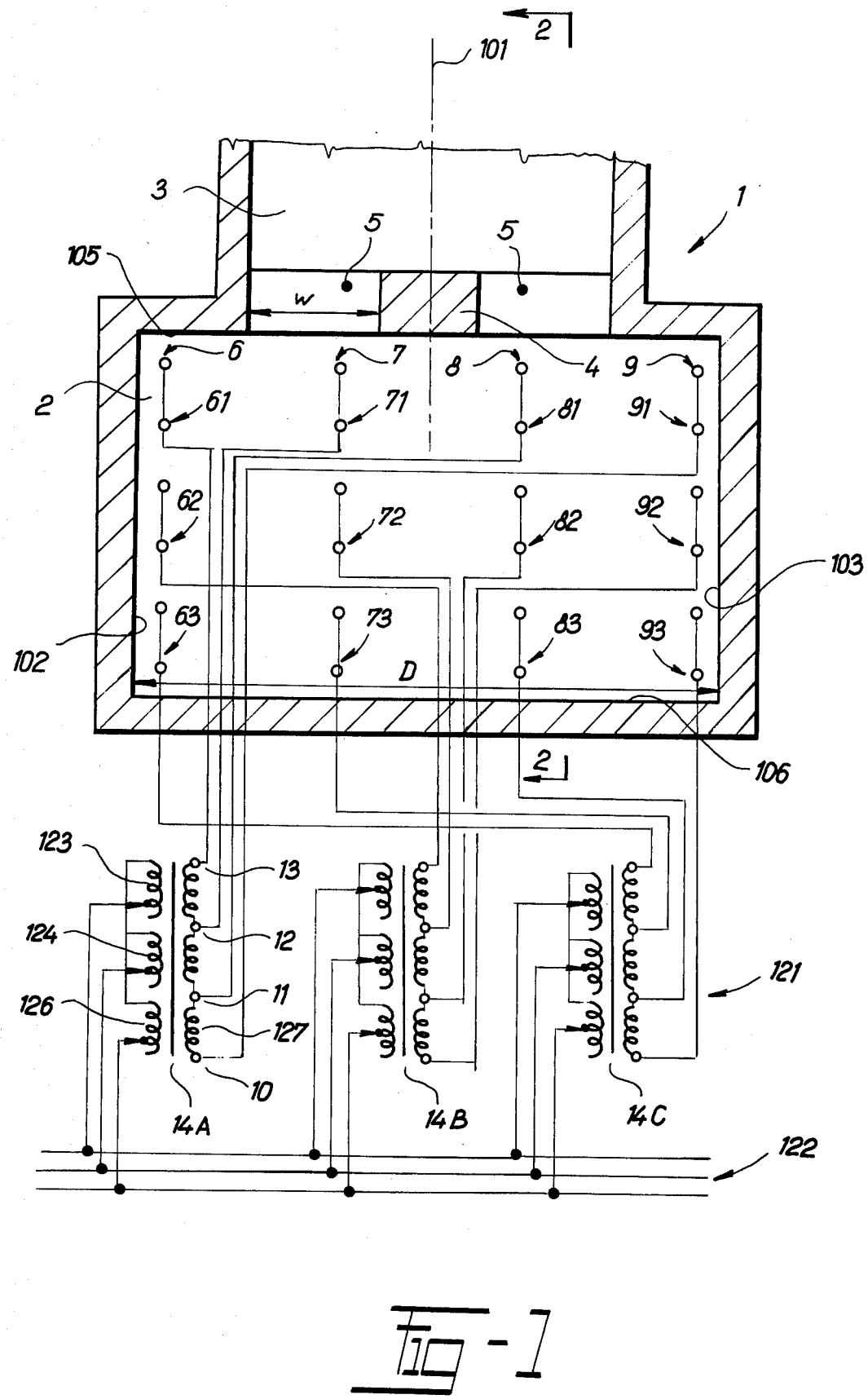
FIG. 1 is a sectional plan view of the lower portion of an electric glass-melting furnace constructed in accordance with the invention, illustrating a pair of connecting passages between the melting and working portions of the furnace and depicting a novel arrangement of heating electrodes in the melting zone of the furnace.

Referring now to the drawing, an electric glass-melting furnace 1 is provided with a glass-melting zone 2 and a working zone 3 which is located longitudinally downstream, along an axis 101, from the melting zone 2 for guiding a glass melt to suitable external facilities (not shown) for further handling or working.

The melting zone is bounded by a pair of longitudinal surfaces 102, 103 and a pair of adjoining transverse surfaces 104, 106 define the inner peripheries of a plurality of vertical walls 107 which extend upwardly from a bottom melting zone surface 108. In a conventional manner, the glass melted in the furnace 1 has an effective height H, which may be maintained constant by a suitable regulating system (not shown) associated with a sensor 109. For purposes of the following description, the product of the melt height H in the zone 2 and a transverse dimension D (FIG. 1) of the bounding surface 106 of such zone will be referred to as the "transverse cross-section" of the zone 2.

The interface between the melting zone 2 and the working zone 3 has associated therewith a vertical partition 4 which may be provided with suitable cooling facilities (not shown). The bottom portion of the partition 4 is apertured to define a pair of restricted passage 5, 5 through which the glass melt which is heated in the melting zone 2 may flow into the working zone 3 and out of the furnace for further processing. As indicated, the height of each passage 5 is designated with the dimension S, and the transverse extent of each such passage is designated W (FIG. 1). For purposes to be described, the product of the height S and the transverse extent W of each passage 5 will be designated its "transverse cross-section".

The melting zone 2 is provided with a plurality of vertically extending electrodes which are directly affixed to the bottom surface 108 of the zone.

In accordance with the invention, the electrodes are arranged in a plurality of longitudinal rows 6–4 which are mutually separated from each other between the longitudinal walls 102 and 103 of the zone 2. The row 6 is defined by at least two longitudinally spaced electrode units, each unit consisting of a pair of conductively connected ones of the electrodes particular arrangement of FIG. 1, three electrode units indicated at 61, 62 and 63 are provided. The successive units 61–63 in the row 6 are disposed progressively further from the wall 104 and thus from the restricted passages 5 in the partition 4.

The successive rows 7, 8 and 9 are individually provided with (a) electrode units 71, 81 and 91 which transversely correspond to the electrode unit 61; (b) electrode units 72, 82 and 92 which individually correspond to the electrode unit 62; and (c) electrode units 73, 83 and 93 which correspond transversely to the unit 63.

Such electrodes, which are conventionally designed to heat the adjacent portion of the glass melt when electrical excitation is applied to such electrodes, are excited by a multiphase, multitap voltage supply 121 which in turn is energized from three-phase AC mains 122.

In particular, the supply 121 has a first three-phase transformer 14A for exciting the electrode units 61, 71, 81, 91, closest to the restricted passages 5. The supply 121 also has a second three-phase transformer 14B, which is employed for exciting the electrode units 62, 72, 82, 92, and a third three-phase transformer 14C for exciting the units 63, 73, 83, 93 most remote longitudinally from the passages 5.

The transformers 14A, 14B and 14C have identical three-phase primary windings 123, 124, and 126 individually coupled to the respective branches of the three-phase mains 122. Each of such transformers has a cyclically excited, multitap secondary winding 127, each winding having a plurality of spaced tap points 10 – 13 for providing cyclic excitation of a given amplitude to the associated set of transversely spaced electrode units. In particular, the amplitude of the secondary voltage of the transformer 14A is larger than that of the transformer 14B, which if desired may be larger than that of the transformer 14C. This is achieved, e.g., by appropriately adjusting the number of turns on the primary windings 123, 124, 126.

As a result of such excitation pattern, the rows 6 – 9 individually exhibit successive phase delay, while each of the individual electrode units in each row are excited in phase. Additionally, the amplitude of excitation of the units 61, 71, 81, 91 is greater than that of the units 62, 72, 82, and 92, which in turn is greater than that of the units 63, 73, 83 and 93. Because of the progressive phase delay among successive rows, and the equiphase excitation of the individual units in each row, the entire glass mass within the melting zone 2 is substantially uniformly heated to provide an improved homogeneity relative to prior art arrangements. In addition, the augmented amplitude of voltage excitation of the electrode units adjacent the passage 5 leads to a localized agitation of the melt adjacent the entrance wall of each of the passages 5, leading to an upward and rearward flow of melt as indicated by arrows 131 in FIG. 2. Such upward flow, and the resulting circulation of melt in the counter-clockwise direction as viewed in FIG. 2 assures that the melt that finally enters the working space 3 through the passages 5 is sufficiently molten and clear to yield the desired properties. Such circulation, starting at the rear surface of the partition wall 4 and extending back to and downwardly along the rear zone wall 107, further increases the homogeneity of the mass.

Further, in accordance with the invention, it has been found that even after the now-homogenized melt leaves the melting zone and flows into the working space 3, as indicated by arrows 132, a portion of such melt can be made to reverse upon itself and return via the same passage 5 along the lower surface 108 of the zone 2 by suitably choosing the relative transverse cross-sections, as defined above, of the melting zone 2 and each passage 5. Such reverse flow of the melt, after passage along the surface 108, again reverses upon itself as shown by arrows 133 to rejoin the main flow of melt to which the above-mentioned counter-clockwise circulation has been imparted.

In order to ensure an optimum reverse flow, which has been found to provide efficient cooling of the surface 108 without the necessity of refractory blocks, auxiliary cooling, and other requirements of the prior art, it is particularly advantageous to choose the so-called effective dimension of the transverse cross-section of each passage 5 at a magnitude within the range of 20 – 30% of the corresponding equivalent dimension of the transverse cross-section of the melting zone 2.

Figure 2:
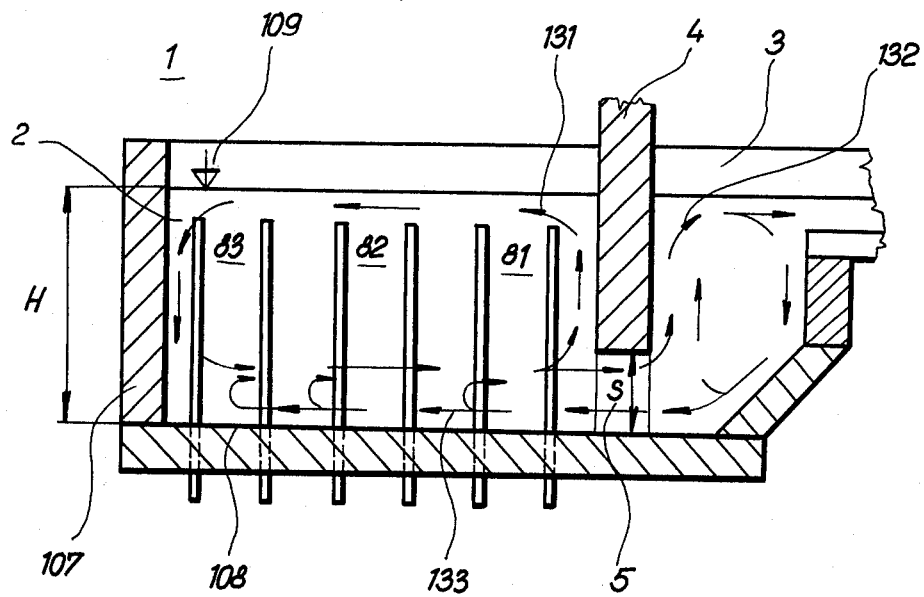
FIG. 2 is an elevational sectional view taken along line 2—2 of FIG. 1.

Such effective dimension, which can be calculated directly with the rectangular configurations of the arrangement of FIGS. 1 and 2, is generally represented by the expression (A/C), where A is the area of the appropriate transverse cross-section and C is the circumference of such cross-section. Stated mathematically, the prescription that the effective transverse dimension of a passage 5 be within the 20 – 30% range of the corresponding equivalent transverse dimension of the zone 2 can be expressed as follows:

$$.2\frac{A_2}{C_2} \leq \frac{A_1}{C_1} \leq .3\frac{A_2}{C_2},$$

where $A_1$ is the area of the transverse cross-section of the restricted passage, $C_1$ is the circumference of the transverse cross-section of the restricted passage, $A_2$ is the area of the transverse cross-section of the melting zone, and $C_2$ is the circumference of the transverse cross-section of the melting zone.

In the foregoing, an illustrative embodiment of the invention has been described. Many variations and modifications will now occur to those skilled in the art. For example, while each electrode unit in a row of electrodes in the melting zone 2 has been described as consisting of two conductively connected electrodes, such unit can, if desired, consist of more or less than the two depicted electrodes, provided only that each electrode in a unit be excited with the same potential. It is accordingly desired that the scope of the appended claims not be limited to the specific disclosure herein contained.

What is claimed is:

1. In an electric glass-melting furnace, a substantially rectangular melting zone having upwardly extending walls for receiving a glass melt to a desired first height, the zone having a first transverse and a second longitudinal dimension; a working zone longitudinally adjacent the melting zone; a vertical partition disposed at the interface between the working and the melting zones, the partition defining at its lower end and a restricted passage for accommodating a flow of glass melt between the melting and working zones; at least first, second and third spaced, transversely successive, longitudinally extending rows of elongated electrodes, each electrode extending upwardly from and directly affixed to the bottom surface of the melting zone, each row having first and second longitudinally spaced, transversely aligned electrode units; multiphase, multitap supply voltage means for generating first, second and third AC voltages having identical, relatively large amplitudes and exhibiting a progressive phase shift therebetween, and fourth, fifth and sixth AC voltages having identical, relatively small amplitudes and the same progressive phase shift therebetween, the first and fourth voltages exhibiting the same relative phase; first means for individually coupling the first and second voltages between the first units of the first and second rows and between the first units of the second and third rows, respectively; and second means for individually coupling the fourth and fifth voltages between the second units of the first and second rows and between the second units of the second and third rows, respectively.

2. A furnace as defined in claim 1, in which each electrode unit comprises a pair of longitudinally spaced, conductively connected ones of the electrodes.

3. A furnace as defined in claim 1, in which the transverse cross-section of the restricted passage is chosen relative to the transverse cross-section of the melting zone so that $$.2 \frac{A_2}{C_2} \leq \frac{A_1}{C_1} \leq .3 \frac{A_2}{C_2},$$

where $A_1$ is the area of the transverse cross-section of the restricted passage, $C_1$ is the circumference of the transverse cross-section of the restricted passage, $A_2$ is the area of the transverse cross-section of the melting zone, and $C_2$ is the circumference of the transverse cross-section of the melting zone.

4. A furnace as defined in claim 1, in which the furnance comprises, first, second, third, and fourth spaced, transversely successive, longitudinally extending ones of the rows of elongated electrodes; in which the first coupling means further comprises means for applying the third voltage between the first units of the third and fourth rows; and in which the second coupling means further comprises means for applying the sixth voltage between the second units of the third and fourth rows.

* * * * *